Dec. 29, 1931.　　　C. F. MOSES　　　1,838,437
GANG SAW APPARATUS
Filed Sept. 11, 1930　　　5 Sheets-Sheet 1

Dec. 29, 1931.      C. F. MOSES      1,838,437
GANG SAW APPARATUS
Filed Sept. 11, 1930      5 Sheets-Sheet 2

Inventor:
Charles F. Moses.
by Charles K. Hills Attys.

Dec. 29, 1931. C. F. MOSES 1,838,437
GANG SAW APPARATUS
Filed Sept. 11, 1930  5 Sheets-Sheet 3

Inventor:
Charles F. Moses,
by Charles H. Hills Attys.

Dec. 29, 1931.  C. F. MOSES  1,838,437
GANG SAW APPARATUS
Filed Sept. 11, 1930  5 Sheets-Sheet 4
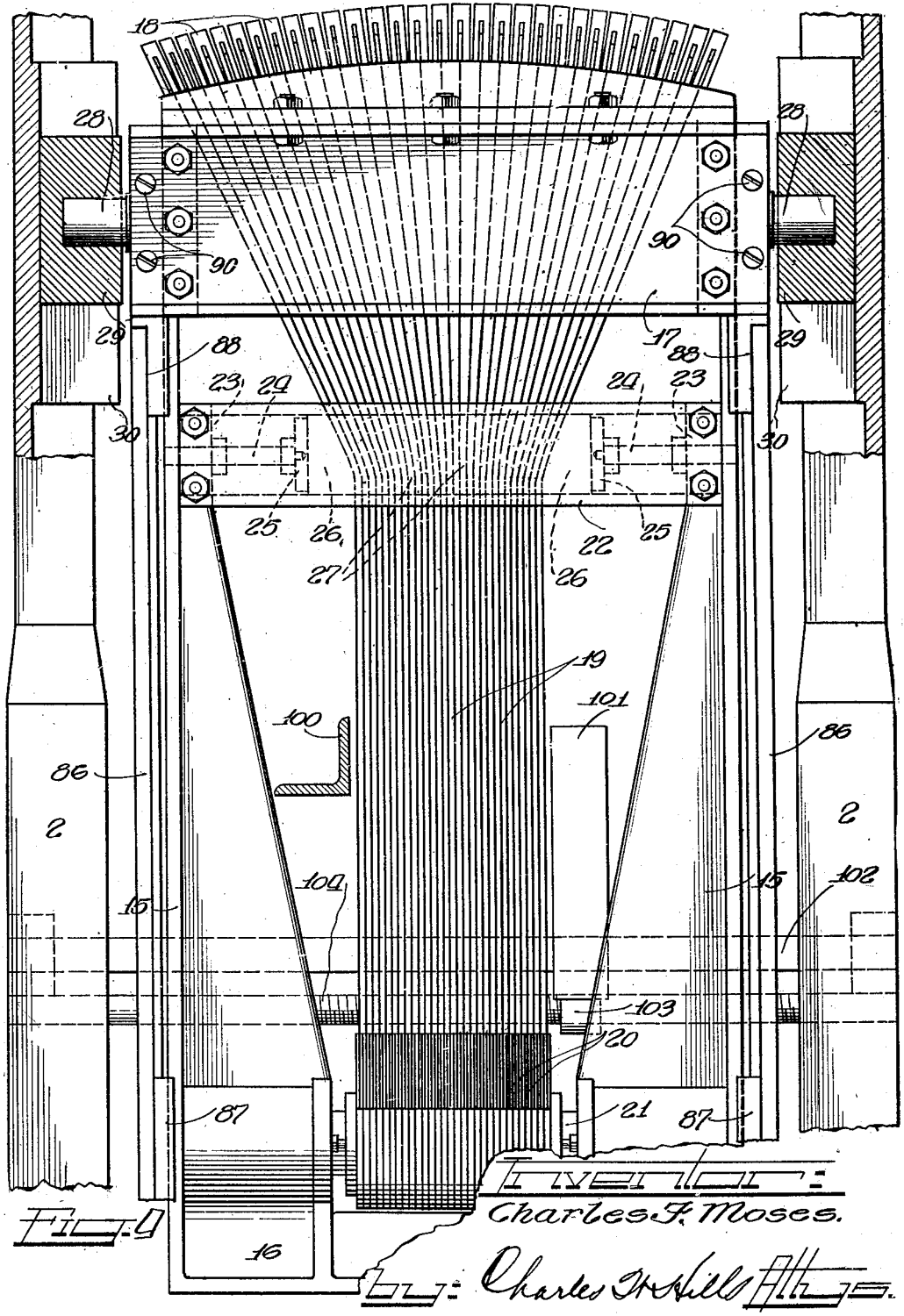

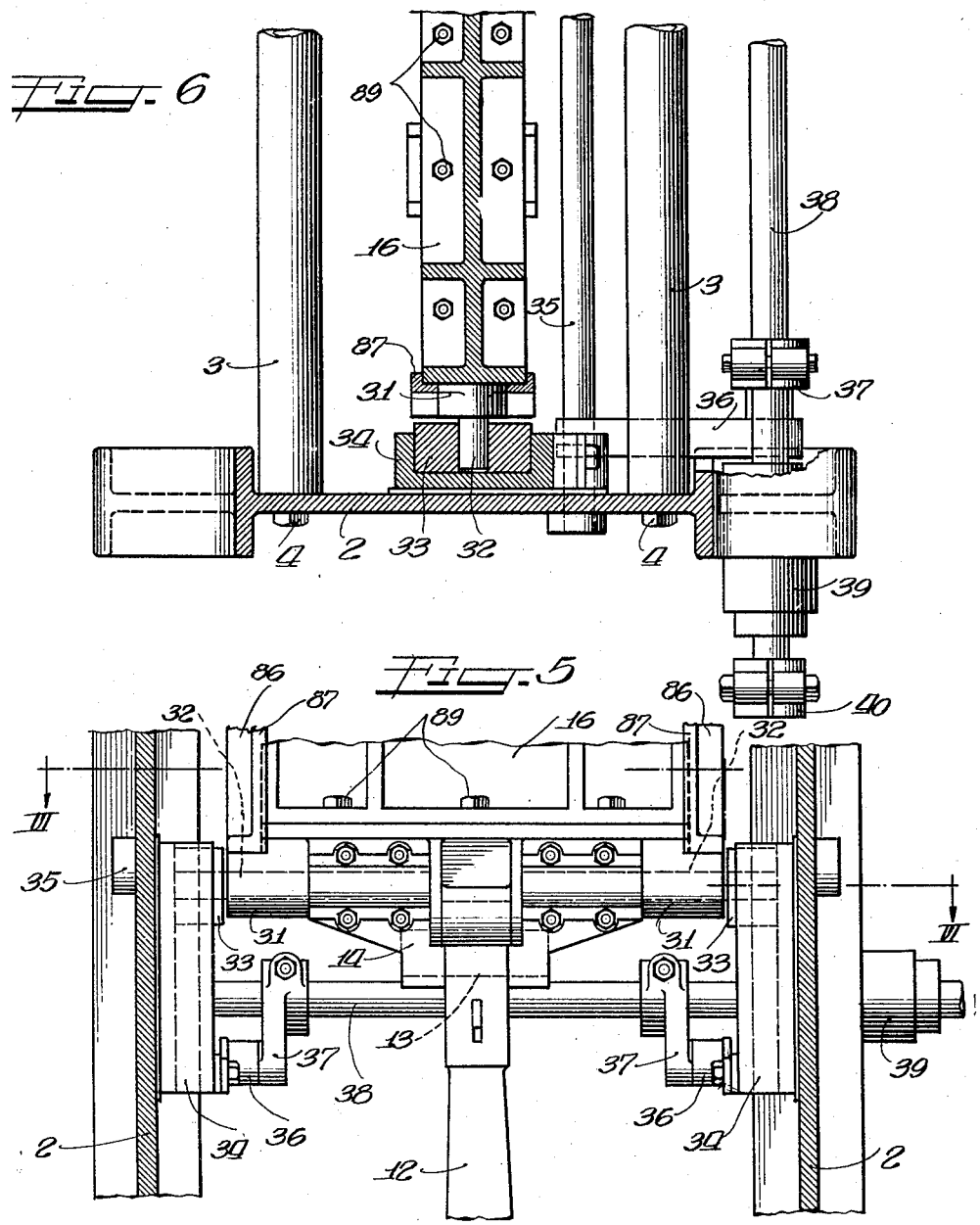

Patented Dec. 29, 1931

1,838,437

UNITED STATES PATENT OFFICE

CHARLES F. MOSES, OF SHEBOYGAN, WISCONSIN

GANG SAW APPARATUS

Application filed September 11, 1930. Serial No. 481,127.

This invention relates to an improved type of gang saw apparatus or machine provided with a reciprocating and pivotally mounted intermediate frame adapted to carry a gang saw sash unit which is removably secured in interfitting relation with the intermediate frame to be operated thereby. The gang saw sash unit is constructed and mounted to permit the same to be removed as a unit from the intermediate frame in a comparatively short time to facilitate making repairs or replacement of parts. The gang saw sash unit is mounted to be operated by the intermediate frame to cause the gang saw blades to cut on their downward stroke into a block or log adapted to be fed through the field of operation of the gang saw unit by means of a plurality of feed rollers and a presser roller over an improved adjustable chip breaker or supporting table positioned between the innermost feed roller and closely adjacent the cutting edges of the gang saw blades, said block or log furthermore adapted to pass beneath a stop or guide bracket positioned above the chip breaker table and between the presser roller and the gang saw blades to properly guide the block or log and hold the same properly aligned after the end of the log passes the presser roller to obviate any tendency of the log from springing upwardly and greatly facilitating the proper cutting of the log into thin strips or boards by the gang saw blades without any danger of chipping or breaking out at the end of the log.

It is an object of this invention to provide an improved type of gang saw machine having a reciprocating intermediate frame for carrying a gang saw sash unit which may be conveniently and rapidly released from attachment to the intermediate frame to permit the gang saw sash unit to be lifted out of the machine for repairs or replacement of parts.

It is also an object of this invention to provide an improved gang saw machine provided with a removable gang saw sash unit and with an adjustable chip breaker or support immediately adjacent the cutting plane of the gang saw sash unit to obviate chipping or breaking out of the trailing ends of a block or bolt of wood being cut into thin boards by means of the improved gang saw sash unit.

It is a further object of this invention to provide an improved type of gang saw machine having a reciprocating auxiliary frame to which a gang saw sash unit is removably connected and is furthermore adapted to be carried by the intermediate frame through a continuous eccentric path to coact with a bolt or block of wood which is adapted to be fed between a plurality of guide and feed rollers over an adjustable supporting table and beneath a guide or stop bracket positioned between the rollers and the removable gang saw sash unit to control the movement of the trailing end of the block or bolt of wood obviating breakage or chipping thereof to permit a complete sawing of the entire bolt or block of wood into thin strips or boards.

It is furthermore an object of this invention to provide an improved type of gang saw machine provided with a removable gang saw sash unit adapted to be carried by a reciprocating auxiliary frame and movable through a continuous eccentric path between a plurality of sets of triangularly arranged feed rollers adapted to guide and steady bolts or blocks of wood as they are being fed through the field of operation of the gang saw sash unit and between suitable guide and retaining members facilitating the complete cutting of the bolts or blocks of wood into thin boards without chipping or breaking out of the trailing ends of said bolts or blocks of wood.

Still another object of the invention is to provide an improved type of gang saw machine provided with a removable gang saw sash unit mounted to be reciprocated through an endless eccentric path permitting the cutting edges of the saw blades to be advanced into a bolt of wood being fed between lower and upper guide members mounted to the inside of a plurality of entrance feed rollers for advancing the bolt of wood through the field of operation of the gang saw blades for cutting the bolt of wood into thin boards which are advanced in grouped relation between suitable discharge guides by means of a plurality of discharge feed rollers.

It is an important object of this invention to provide an improved type of gang saw machine of improved and simplified construction wherein bolts of wood are adapted to be cut into very thin boards without chipping or breaking out of the trailing ends of the bolts; said cutting of the bolts of wood being accomplished by means of gang saw blades carried in a removable gang saw supporting sash removably secured in a reciprocating frame which is pivotally and slidably supported in the machine frame between a plurality of sets of feed and presser rollers and between a plurality of sets of adjustable material guides adapted to support and guide the material before and after being cut with one of said sets of guide members serving to obviate chipping or breaking out of the material at the trailing end thereof.

Other and further important objects of this invention will be apparent from the disclosures in the specification and the accompanying drawings.

This invention (in a preferred form) is illustrated in the drawings and hereinafter more fully described.

On the drawings:

Figure 4 is an enlarged fragmentary vertical detail view of the gang saw sash unit and the supporting means therefor taken on line IV—IV of Figure 3 and illustrating the gang saw bearing blocks and portions of the machine framework in section.

Figure 5 is an enlarged fragmentary vertical detail view taken on line V—V of Figure 3.

Figure 6 is a fragmentary horizontal detail sectional view taken on line VI—VI of Figure 5.

As shown on the drawings:

Figure 1:
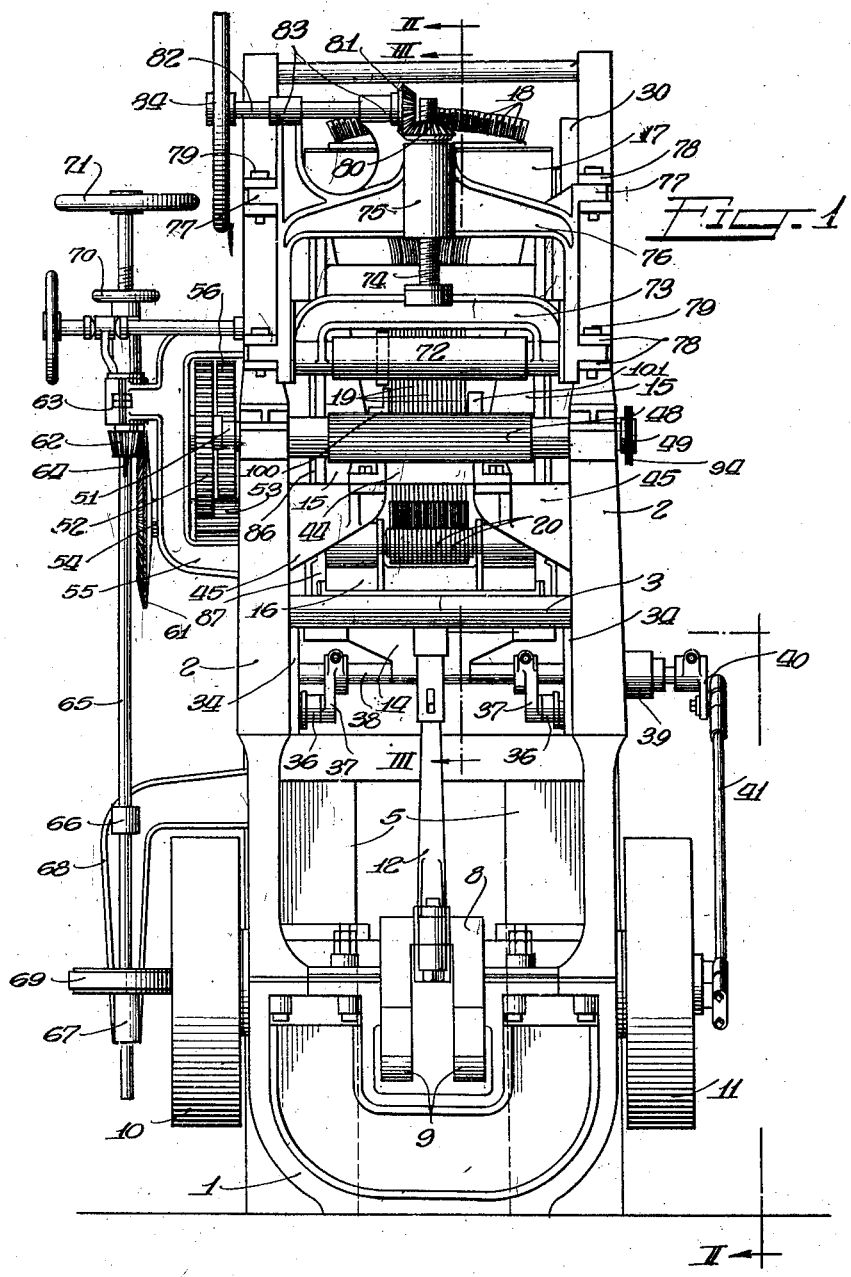
Figure 1 is a front elevation of a gang saw machine embodying the principles of this invention.

The gang saw machine comprises a base casting or yoke 1 adapted to be secured on the floor and having supported thereon in spaced relation a pair of upright parallel side frames or wall sections 2 which are separated by spacing tubes or pipes 3 through which tie-bolts 4 project to rigidly clamp the upright frames together. Foundation blocks 5 are rigidly clamped against the front and back of the lower portion of the side frames 2 and are held in place by means of tie-bolts 6 or other suitable means.

Journalled in suitable bearings provided between the frame members 1 and 2 is a crank shaft 7 provided with a crank arm 8 and counterweights 9. Secured on one projecting end of the crank shaft 7 is a driving pulley 10 adapted to receive a drive by means of an endless belt engaged therearound and connected with any suitable source of driving power. Secured on the opposite projecting end of the crank shaft 7 is a flywheel 11. Pivotally connected to the crank arm 8 is the lower end of a pitmen or connecting rod 12, the upper end of which is pivotally connected to a stub shaft 13 supported in a yoke casting 14 which forms the lower cross member of a reciprocating intermediate frame. The intermediate frame comprises the lower cross member or casting 14 having rigidly secured or formed thereon parallel side members or sills 86 provided on their inner sides with lower channel guide members 87 and upper channel guide members 88.

Slidably and removably engaged downwardly through the upper end of the intermediate frame within the guide members 87 and 88 is an improved gang mill saw sash unit comprising a pair of parallel side sills 15 connected at their lower ends by a cross member 16. The upper ends of the side sills 15 are rigidly connected by means of upper cross members 17 arranged to afford a space therebetween for the reception of a plurality of adjacently positioned saw blade stretcher mechanisms 18 of a type more clearly described in detail in my copending application for patent for a "Gang saw", filed May 6, 1929, Serial No. 361,641 Patent No. 1,767,390. The stretcher mechanisms 18 are connected with the upper ends of a plurality of gang saw blades 19 forming a part of the device. The lower ends of the gang saw blades 19 are secured in mounting heads 20 which are apertured to permit the same to be engaged on a shaft or mounting rod 21 which is supported across the lower portion of the gang saw frame base member 16.

The upper section of the gang saw sash or frame is provided with a pair of cross members 22, the ends of which are rigidly connected to the sash sills 15. Rigidly secured in each end between the cross members 22 is a block 23 having a threaded passage therethrough for the reception of a clamping screw 24. The inner end of each of the clamping screws 24 is engaged in a socket or fitting 25 secured on the outer face of a slidable clamping block 26 slidably engaged between the cross members 22, as clearly illustrated in Figure 4. The inner surface of each of the clamping blocks 26 has the middle portion thereof grooved and curved to afford a curved or rounded supporting surface against which a portion of the outermost blades 19 on one side of the sash frame is adapted to seat. Engaged between the clamping blocks 26 are a plurality of saw blade separators 27. The separators 27 are curved and are provided with grooves similar to the construction illustrated and described in connection with my copending application for patent hereinbefore referred to. The middle separator 27 is substantially straight and the separators on both sides thereof are curved outwardly toward the end clamping blocks 26. This arrangement affords a fanned out layout for the separators, permitting the saw blades 19 to be directed downwardly between the separators, as illustrated in Figure 4, allowing the upper portions of the saw blades to have a curved bearing upon the convex surfaces of the separators. The various saw blades are permitted to pass downwardly from between the separators which are so shaped that the saw blades have the cutting sections thereof positioned substantially parallel to one another and in close proximity to each other to afford an improved gang saw arrangement between the cross members 22 and the supporting shaft 21 on which the lower ends of the saw blades are engaged.

The removable gang saw sash unit, when seated in the intermediate frame, is positioned so that the lower cross member 16 is seated against the top surface of the bottom cross member 14 of the intermediate frame and is removably secured thereto by means of retaining bolts 89 or the like. The ends of the upper cross members 17 of the gang saw sash project beyond the side sills 15 and have the ends of the lower flanges thereof seated against the upper ends of the upper guide members 88 forming a part of the intermediate frame. The projecting ends of the upper cross members 17 are provided with openings for the reception of retaining screws or bolts 90 which project into the upper ends of the intermediate frame sills 86 thereby rigidly holding the gang saw sash frame locked within the intermediate frame to be actuated thereby.

Rigidly secured at right angles near the upper ends of the intermediate frame sills 86 are two stub shafts 28, the outer ends of which are journalled in slidable bearing blocks 29 which are slidably disposed in guide channels 30 formed on the inner faces of the upper portions of the machine side frames or walls 2, as clearly illustrated in Figure 4.

The gang saw sash carrying frame is connected to be operated by means of the pitmen 12 which in turn is operated by the crank shaft 7. On the downward stroke of the gang saw sash unit, together with the intermediate frame, the movement of the sash unit is vertically downward and slightly outwardly into the advancing material until the lower end of the stroke is reached at which time the intermediate frame and the gang saw sash unit carried thereby is swung from the full line position indicated in Figure 3 into the dotted line position about the pivot pins or stub shafts 28 to move the toothed cutting edges of the gang saw blades 19 away from the uncut section of the material during the return or upward stroke of the intermediate frame and the gang saw sash unit. The intermediate frame and the gang saw sash unit carried thereby is mounted to permit the same to travel in a continuous eccentric path, said movement being controlled by an eccentrically operated mechanism which will now be described.

Journalled in suitable bearings 31 forming a part of the lower cross member 14 of the intermediate frame is a pair of aligned auxiliary shafts 32 having rollers 33 mounted on the outer projecting ends thereof. The rollers 33 are engaged in guide grooves formed in a pair of channel guide brackets 34 which are pivotally engaged at their upper rear corners on a shaft or rod 35, the ends of which are supported in the machine frame side members 2.

Pivotally connected to the lower rear corner of each of the pivoted guide brackets or plates 34 is one end of a toggle bar or link 36. The other or outer end of the toggle bar 36 is pivotally connected to a crank arm 37 which is securely clamped in position on a shaft 38. The shaft 38 projects across the machine and is journalled in suitable bearings 39 forming a part of the side frames or members 2 of the machine. As clearly illustrated in Figure 5, there are two crank arms 37 secured to the shaft 38 and said crank arms are pivotally connected with the pivoted guide plates 34 by means of the toggle members 36.

Figure 2:
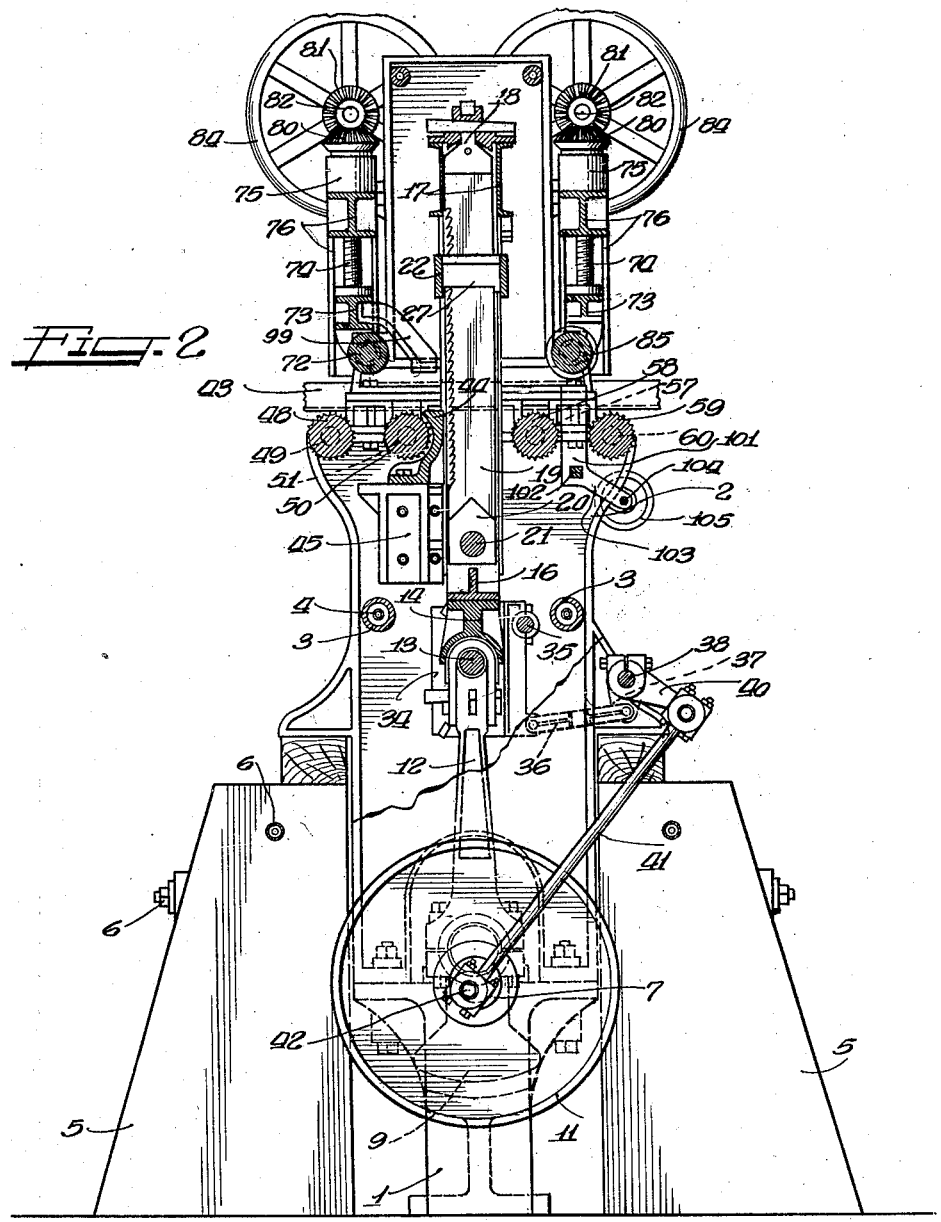
Figure 2 is a vertical sectional side view of the machine taken on line II—II of Figure 1.

Secured on one projecting end of the shaft 38 is a crank arm 40 to the end of which is pivotally connected the upper end of an eccentric rod or connecting rod 41. The lower end of the connecting rod 41 is pivotally connected on an eccentric pin 42 projecting from one end of the crank shaft 7 as clearly illustrated in Figure 2. The eccentric control mechanisms just described are adapted to cause the intermediate frame and the gang saw sash unit carried thereby to be pivotally actuated about the supporting shafts 28 to swing from the full line position of Figure 3 into the dotted line position during the return section of the cycle of movement of the intermediate frame and the gang saw sash unit carried thereby. The continuous eccentric path movement of the gang saw sash unit causes the cutting teeth of the gang saw blades to move downwardly across and into advancing material during the downward or cutting portion of the cycle of movement of the gang saw sash unit to cause the material to be cut into thin boards.

During the return section of the cycle of movement of the gang saw sash unit, the cutting edges of the gang saw blades move away from the uncut section of the advancing material to obviate any upward strains being applied to the advancing material during the return movement of the gang saw blades into a position ready for the next cutting operation.

Figure 3:
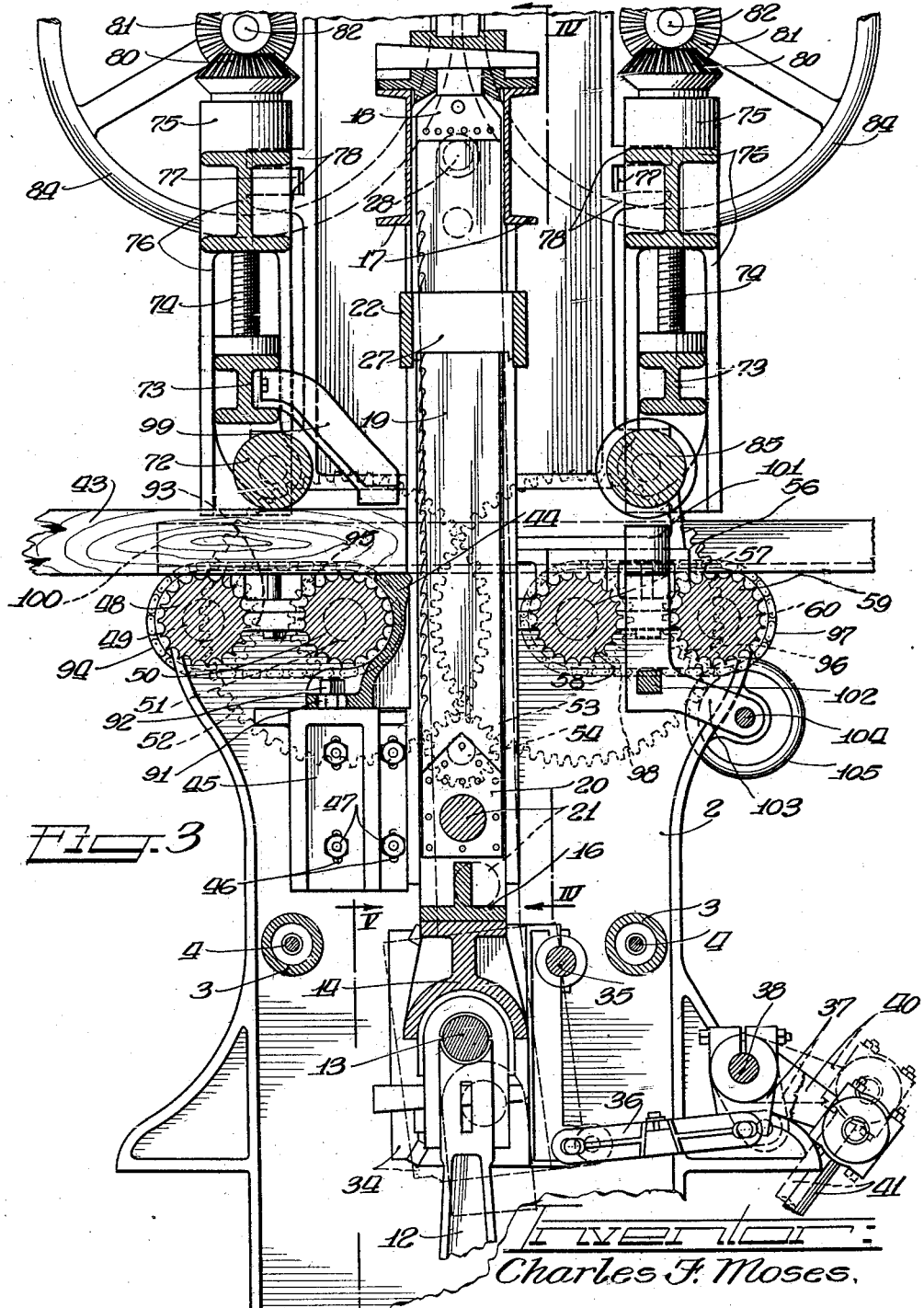
Figure 3 is an enlarged vertical detail section taken on line III—III of Figure 1, illustrating the operation of the gang saw sash in dotted lines and showing a fragmentary portion of the eccentric control mechanism for pivoting the gang saw sash.

A bolt or block of wood 43 (Figure 3) which is to be cut into thin boards is adapted to be fed into the cutting side of the machine over an adjustably mounted table or material supporting bar 44 in the form of a flanged casting having slots 91 formed therein for the reception of mounting bolts 92. The material supporting table 44 is mounted between the side frames 2 of the machine and is adapted to be adjustably clamped in position upon a pair of supporting brackets 45. As indicated in Figure 3, the supporting brackets 45 are provided with slots 46 permitting said brackets to be adjustably mounted by means of clamping bolts 47 on the inner side of the machine frame members 2. The material supporting table 44 is mounted immediately adjacent the cutting side of the gang saw sash unit to afford a suitable support for the bolt or block of wood 43 as closely as possible adjacent the toothed cutting edges of the saw blades 19.

The block or bolt of wood 43 is adapted to be advanced into the machine by means of a longitudinally corrugated or ribbed outer feed roller 48 supported on a shaft 49, the ends of which are journalled in suitable bearings provided on the side frame members 2. Secured on one projecting end of the roller supporting shaft 49 is a sprocket 93 around which an endless driving chain 94 is trained. The chain 94 is also trained around a driving sprocket 95 which is secured on one projecting end of a feed roller supporting shaft 51 journalled in suitable bearings upon the side frame members 2. The shaft 51 supports an inner main feed roller 50 parallel to and on the inner side of the outer main feed roller 48. The second feed roller 50 is also longitudinally corrugated or ribbed. The bolt or block of wood 43 is adapted to be feed or advanced into the machine by the two feed rollers 48 and 50 which engage the underside of the material and afford a double support therefor as the material is advanced over the supporting table 44 into the field of operation of the gang saw blades.

Secured on the second projecting end of the roller supporting shaft 51 is a large gear 52 which is in mesh with a driving pinion or small gear 53. The driving pinion 53 is mounted on a stub shaft 54 which is journalled in suitable bearings provided on one of the side frames 2 and by a bracket 55 secured on the outer side of said side frame. Also meshing with the driving pinion 53 is a second large gear 56 which is mounted on one projecting end of a roller shaft 57 which is journalled in suitable bearings provided on the side frames 2. Supported on the shaft 57 is a longitudinally corrugated or ribbed discharge feed roller 58. The discharge feed roller 58 is mounted on the opposite side of the gang saw sash unit as clearly illustrated in Figure 3 and is disposed in the same plane as the main feed rollers 48 and 50. Rotatably mounted in the same plane as the inner discharge feed roller 58 is a longitudinally corrugated or ribbed outer discharge feed roller 59 which is supported on a shaft 60. The ends of the shaft 60 are journalled in suitable bearings provided on the machine side frames 2. Secured on one projecting end of the roller supporting shaft 60 is a sprocket 96 around which a driving chain 97 is engaged. The chain 97 is also engaged around a sprocket 98 which is secured on one projecting end of the roller supporting shaft 57 to permit a drive to be transmitted from the roller shaft 57 to the roller shaft 60.

It will thus be noted that the machine is provided with a pair of corrugated feed rollers on each side of the gang saw sash unit to afford double supports for the advancing material before it is cut as well as double supports for the material after the same has been cut into thin boards by the gang saw blades.

The driving pinion 53 is adapted to receive a drive from a beveled gear 61 which is keyed or otherwise secured on the outer end of the stub shaft 54 as clearly illustrated in Figure 1. The beveled gear 61 is in mesh with a beveled pinion 62 which is rotatably supported beneath a bearing arm 63 forming a part of the bracket 55. Slidably engaged through the driving pinion 62 and connected therewith by means of a key 64 is a vertical shaft 65, the lower portion of which is journalled in suitable bearing sleeves 66 and 67. The bearing sleeves 66 and 67 are supported on a bracket 68 provided on the outer side of one of the side frame members 2 of the machine. Keyed or otherwise secured to the vertical shaft 65 between the bearing sleeves 66 and 67 is a friction roller or disc 69, the peripheral surface of which has frictional bearing contact with the outer surface of the driving wheel or pulley 10. The speed of the shaft 65 is adapted to be varied by varying the relative position of the friction disc 69 with respect to the driving pulley 10.

For the purpose of vertically adjusting the shaft 65, said shaft has threaded engagement with a rotatable bearing unit 70. The bearing unit 70 is rotatably supported upon the bearing extension 63. Secured on the upper end of the shaft 65 is a hand wheel 71. By rigidly holding the rotatable bearing unit 70 against rotation, the vertical shaft 65 may be threaded upwardly or downwardly through the bearing unit 70 by means of the hand wheel 71 so that the friction wheel or disc 69 may be moved toward or away from the periphery of the driving pulley 10, thereby varying the speed of rotation of the vertical shaft 65.

The bearing unit 70 is normally adapted to rotate with the shaft 65. The driving pinion 62 is adapted to impart a drive from the shaft 65 to the beveled gear 61 which in turn is adapted to rotate the pinion 53 and the large gears 52 and 56 meshing therewith.

For the purpose of holding the bolt or block of wood 43 in engagement with the two entrance feed rollers 48 and 50, a pressure or bearing roller 72 is located above the space provided between the feed rollers 48 and 50 to afford a triangular relation between the three rollers at the entrance side of the machine to facilitate feeding of the material over the supporting table 44 and into the field of operation of the gang saw sash blades. The material is thus advanced into the machine over the feed rollers 48 and 50 and the table 44 and beneath the presser roller 72 so that the material is properly guided and held in position.

For the purpose of holding and retaining the trailing end of the block of wood 43 after the end of the block passes the presser roller 72 a stop bracket or guide shoe 99 is positioned between the presser roller 72 and the gang saw sash unit, as clearly illustrated in Figure 3. The stop bracket 99 has the lower end thereof positioned substantially above the supporting table 44 and slightly above the top surface of the material or block of wood 43, as it passes into the machine. After the end of the material passes the presser roller 72, said material is prevented from swinging upwardly by the stop bracket, thereby greatly facilitating cutting or sawing of the trailing end of the block of wood.

The presser roller 72 has the ends of the supporting shaft thereof journalled in a vertically slidable bracket 73 which is supported by means of a screw shaft 74. The screw shaft 74 projects upwardly through a sleeve 75 forming a part of a gate bracket 76 having suitable grooves formed therein in which the ends of the vertically adjustable bracket or yoke member 73 are adapted to slide. The gate frame 76 is provided with a plurality of apertured lugs 77 on each side thereof to form hinge members which project between pairs of apertured lugs or extensions 78 which are integrally formed on the front edges of the side frame 2 as clearly illustrated in Figure 1. The gate frame lugs 77 are positioned between the side frame lugs or projections 78 and are hingedly supported in position by means of hinge pins 79, two of which may be removed from one side of the gate frame to permit the frame to be pivotally swung outwardly about the remaining two pins. This arrangement is provided to permit access to be had to the gang saw sash unit when necessary.

Rotatably supported on the upper end of the bearing sleeve 75 is a beveled gear 80 which is internally threaded to adjustably receive the threaded shaft 74 to permit the bracket 73 to be raised or lowered so that the bearing roller 72 may be adjusted with respect to the top surface of the material which is fed into the machine. Meshing with the beveled gear 80 is a beveled gear 81 which is mounted on the inner end of a horizontal shaft 82. The shaft 82 is journalled in bearing brackets 83 which are integrally formed on the gate frame 76. A hand wheel 84 is engaged on the outer end of the shaft 82 to permit rotation of the beveled gears 81 and 80 and the adjustment of the presser roller 72 toward or away from the feed rollers 48 and 50.

Mounted above the space between the feed rollers 58 and 59 on the discharge side of the machine is a discharge presser roller 85 which is adjustably mounted on the back of the upper portion of the machine by mechanisms identical with the mechanisms which support the presser roller 72.

The block of wood 43 which is fed into the machine by the feed rollers 48 and 50 passes beneath the presser roller 72 and between the supporting table 44 and the stop bracket 99 into the field of operation of the gang saw blades 19 forming a part of the gang saw sash unit. The material is thus adapted to be cut or sawed into thin boards which are adapted to pass over the discharge feed rollers 58 and 59 and beneath the discharge pressure roller 85. Removably supported on the machine framework is an angle bar guide 100 which projects through the gang saw sash frame as clearly illustrated in Figure 4 to one side of the gang saw blades to afford a suitable guide against which one longitudinal surface of the block or bolt of wood 43 is guided during its travel through the machine. Disposed on the opposite side of the gang saw blades 19 is an adjustable material guide block or arm 101 which projects upwardly between the discharge feed rollers 58 and 59 as illustrated in Figure 3 and has the lower portion thereof slidably engaged on a square guide bar 102, the ends of which are secured to the machine frame members 2. Integrally formed on the lower end of the adjustable guide arm 101 is a bracket arm 103 which is provided with an internally threaded opening through which a feed screw 104 projects. The feed screw is journalled in suitable bearing supports provided on the frame members 2 and has a hand wheel 105 engaged on one projecting end thereof.

The operation is as follows:

The improved gang saw apparatus or machine is adapted to be driven from any suitable source of power by means of a driving belt which is trained around the driving pulley 10. Rotation of the driving pulley 10 causes operation of the crank shaft 7, thereby actuating the pitmen 12 which in turn causes reciprocation of the gang saw frame. The gang saw sash unit has the various saw blades 19 thereof mounted with the main cutting sections associated in close parallel relation as clearly illustrated in Figure 4. This close arrangement of the gang saw blades 19 is made possible by the fanning out arrangement for mounting the upper ends of the blades and connecting the same with the fanned out gang saw stretching or tensioning mechanisms 18.

The gang saw sash unit is removably secured in the intermediate frame 14—83, the upper end of which is pivotally supported in the slidable bearing blocks 29 while the lower end of said intermediate frame is slidably engaged in the pivoted guide members 34. The gang saw sash unit is adapted to be operated with the intermediate frame and in its downward stroke is positioned vertically and is advanced into the bolt or block of wood 43, as the same is advanced into the machine over the feed rollers 48 and 50 and beneath the presser roller 72. The advancing block of wood is guided along one side of the angle bar guide 100 and over the chip breaker table or support 44 and beneath the stop bracket 99. This improved supporting arrangement for the material holds the block of wood in a steady position during its advance through the field of operation of the gang saw blades, which move downwardly through the block of wood closely adjacent the supporting table 44 causing the block of wood to be sawed into thin boards. The material is supported closely adjacent the cutting plane of the gang saw sash unit by the adjustable table or supporting shoulder 44 which serves to obviate chipping or breaking of the material as it is being cut.

The guide arm or bracket 101 is operable by means of the hand wheel 105 and the feed screw 104 so that the guide arm 101 may be properly positioned on the opposite side of the cut material from the guide member 100 so that the cut boards after leaving the gang saw sash unit come into contact with the two discharge feed rollers 58 and 59 passing over said rollers and beneath the discharge pressure roller 85 so that the cut material is properly supported and guided as it is discharged from the machine.

When the trailing end of the block of wood 43 passes from beneath the entrance presser roller 72 any tendency of the material from swinging upwardly away from the feed roller 50 is prevented by the stop bracket 99 which is positioned above the material closely adjacent the cutting side of the gang saw sash unit as clearly illustrated in Figure 3, so that the trailing end of the material is adapted to be properly guided and held in proper feeding position, permitting the gang saw blades 19 to cut through the very end of the material without chipping or breaking the same which heretofore has been a considerable source of trouble and annoyance in cutting bolts or blocks of wood by gang saw sash mechanisms.

On the return or upward stroke of the gang saw sash unit the eccentrically operated connecting rod 41 acts to swing the crank arm 40 from the full line position of Figure 3 into the dotted line position, thereby rocking the control shaft 38 and the crank 37 thereon, whereby the connecting links or toggle members 36 act on the pivoted guide blocks or members 34 to swing the same from the full line position illustrated in Figure 3 into the dotted line position. This pivotal swinging of the guide blocks 34 causes the lower end of the intermediate frame and the gang saw sash unit carried thereby to pivot or swing outwardly away from the supporting table 44 so that with the upward or return movement of the gang saw sash unit, the cutting edges of the saw blades 19 are moved away from the solid portions of the advancing block of wood so that no upward strains are transmitted to the block of wood by the gang saw blades.

The block of wood which is being advanced through the machine is supported on each side of the gang saw sash unit by three-point roller supports in addition to the support afforded by the adjustable table 44 so that the material is firmly held in position as it is advanced through the machine to be cut by the gang saw blades 19. The plurality of feed rollers on each side of the gang saw sash unit together with the positioning of the adjustable supporting table 44 between the feed roller 50 and the gang saw sash blades affords an arrangement whereby the material is prevented from chipping or breaking by the movement of the gang saw blades through the material. The supporting table 44 together with the stop bracket 99 obviates waste of the trailing end of the material since said members hold the material in proper position after leaving the pressure roller 72 and before the same is acted upon by the gang saw blades 19.

Different thicknesses of material are adapted to be fed through the field of operation of the gang saw sash unit since the upper pressure rollers 72 and 85 are adapted to be vertically adjusted toward or away from the feed rollers by merely rotating the hand wheels 84 to cause the beveled gears 82 and 80 to raise or lower the screw shafts 74 so that the yoke bracket 73 supporting the presser rollers 72 and 85 may be conveniently adjusted upwardly or downwardly to bring the presser rollers into frictional rolling contact with the top surfaces of the material which is to be cut. Attention is also directed to the fact that when blocks of wood of reduced width are fed through the machine, the cut material is adapted to be properly guided between the stationary angle guide member 100 and the adjustable guide arm 101 which is adapted to be slidably adjusted on the guide bar 102 by operation of the hand wheel 105 and the feed screw 104. It will thus be noted that the guide arm 101 may be moved toward or away from the guide member 100 depending upon the width of the material which is being fed through the machine.

The entrance feed rollers 48 and 50 and the discharge feed rollers 58 and 59 are adapted to be rotated at various rates of speed depending upon the rotation of the driving pinion or small gear 53. The driving pinion 53 is rotated by means of the intermeshing bevelel gears 61 and 62 which in turn receive their drive from the vertical shaft 65. The shaft 65 is rotated by means of the friction disc or wheel 69 which frictionally contacts the rotatable driving pulley 10. The rate of speed of the vertical shaft 65 is determined by the relative position of the friction disc 69 with respect to the center of rotation of the driving pulley 10. The driving shaft 65 may be raised or lowered by operating the same through the bearing unit 70 by holding the same stationary and rotating the shaft 65 by means of the hand wheel 71.

Wherever it becomes necessary to have access to the upper portion of the gang saw sash unit, it is only necessary to remove the hinge pins 79 from one side of either of the gate frames 76 so that the frame may be pivotally swung outwardly about the remaining two hinge pins to expose the gang saw sash unit to permit adjustment or repairs thereto.

In case it becomes necessary to replace the gang saw blades or make repairs to parts of the gang saw sash unit, said unit is adapted to be removed as a whole from the intermediate frame through the top of the machine. To remove the gang saw sash unit, the angle bar material guide member 100 is first unbolted or removed after which the upper retaining screws or bolts 90 and the lower retaining bolts 89 are removed, whereby the gang saw sash unit is released from attachment to the intermediate frame permitting the entire gang saw sash unit to be moved or lifted upwardly out of the intermediate frame and removed from the machine to permit a new gang saw sash unit to be substituted in place thereof. The cost of making repairs or replacement to the gang saw sash apparatus is thus materially reduced as is also the amount of time required for removing a gang saw sash unit and replacing the same by another.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. In a machine for sawing logs into veneers and having a saw gang, a log-feeding and guiding mechanism comprising feed rolls, a presser roll cooperable with said feed rolls, a table adjustably positioned between said feed rolls and the saw gang, a stop member having a rigid substantially flat work-engaging surface positioned adjacent the saw edges in spaced opposed parallel relation above said table, means for adjustably positioning said presser roll and said stop member, a pair of spaced parallel draw-off rolls, a presser roll cooperative with said draw-off rolls, log-guiding means extending between said feed rolls and said draw-off rolls, and an adjustably positioned guide member movable between said draw-off rolls.

2. In a machine for sawing logs into veneers and having a saw gang, a log-feeding and guiding mechanism comprising feed rolls, a presser roll cooperable with said feed rolls, a table adjustably positioned between said feed rolls and the saw gang, a stop member having a rigid substantially flat work-engaging surface positioned adjacent the saw edges in spaced opposed parallel relation above said table, means for adjustably positioning said presser roll and said stop member, draw-off rolls, a presser roll cooperable with said draw-off rolls, log guiding means extending between said feed rolls and said draw-off rolls, and an adjustably positioned guide member movable adjacent said draw-off rolls.

In testimony whereof I have hereunto subscribed my name at Green Bay, Brown County, Wis.

CHARLES F. MOSES.